United States Patent
Miura et al.

(10) Patent No.: US 8,890,451 B2
(45) Date of Patent: Nov. 18, 2014

(54) SENSORLESS CONTROL UNIT FOR BRUSHLESS DC MOTOR

(75) Inventors: Yuichi Miura, Kariya (JP); Yuki Shishihara, Kashiwara (JP); Daisuke Ozaki, Kitakatsuragi-gun (JP)

(73) Assignee: JTEKT Corporation, Osaka (JP)

( * ) Notice: Subject to any disclaimer, the term of this patent is extended or adjusted under 35 U.S.C. 154(b) by 191 days.

(21) Appl. No.: 13/486,702

(22) Filed: Jun. 1, 2012

(65) Prior Publication Data

US 2012/0326642 A1    Dec. 27, 2012

(30) Foreign Application Priority Data

Jun. 23, 2011   (JP) ................... 2011-139501

(51) Int. Cl.
*H02P 6/20* (2006.01)
*H02P 6/08* (2006.01)
*H02P 6/14* (2006.01)

(52) U.S. Cl.
CPC . *H02P 6/14* (2013.01); *H02P 6/205* (2013.01)
USPC ............. 318/400.11; 318/700; 318/400.01; 318/811; 318/801; 318/400.32; 318/778; 318/779

(58) Field of Classification Search
CPC ............. H02P 6/08; H02P 6/14; H02P 6/182
USPC ............. 318/400.28, 400.04, 400.11, 400.06, 318/400.13, 400.01, 701, 721, 722
See application file for complete search history.

(56) References Cited

U.S. PATENT DOCUMENTS

| | | | | |
|---|---|---|---|---|
| 5,304,903 | A * | 4/1994 | Nakai et al. | 318/400.09 |
| 5,473,232 | A * | 12/1995 | Tamaki et al. | 318/400.04 |
| 5,723,967 | A * | 3/1998 | Hongo et al. | 318/400.11 |
| 5,779,450 | A * | 7/1998 | Fujiwara et al. | 417/45 |
| 7,852,026 | B2 * | 12/2010 | Yokai et al. | 318/400.21 |
| 8,159,162 | B2 * | 4/2012 | Kanamori | 318/400.11 |
| 2003/0107348 | A1 | 6/2003 | Inagawa et al. | |
| 2009/0167220 | A1 | 7/2009 | Kanamori | |
| 2011/0291597 | A1 * | 12/2011 | Kern et al. | 318/400.11 |

FOREIGN PATENT DOCUMENTS

| | | |
|---|---|---|
| JP | A-2004-166436 | 6/2004 |
| JP | A-2005-278320 | 10/2005 |
| JP | A-2008-259334 | 10/2008 |

OTHER PUBLICATIONS

European Search Report dated Aug. 8, 2014 from European Patent Application No. 12171468.7.

* cited by examiner

*Primary Examiner* — Rita Leykin
(74) *Attorney, Agent, or Firm* — Oliff PLC

(57) ABSTRACT

A command rotation speed is set to an initial rotation speed, and a forced commutation mode is started. In the forced commutation mode, a rotation speed is increased by a predetermined increase amount each time and forced commutation is executed until the rotation speed reaches a set rotation speed. Then, a switchover to the sensorless control mode is made when the rotation speed reaches the set rotation speed (S4) and a rotor position becomes detectable.

2 Claims, 3 Drawing Sheets

SENSORLESS CONTROL UNIT FOR BRUSHLESS DC MOTOR

INCORPORATION BY REFERENCE/RELATED APPLICATION

This application claims priority to Japanese Patent Application No. 2011-139501 filed on Jun. 23, 2011 the disclosure of which, including the specification, drawings and abstract, is incorporated herein by reference in its entirety.

BACKGROUND OF THE INVENTION

1. Field of the Invention

The invention relates generally to a sensorless control unit for a brushless direct-current (DC) motor, and more specifically to a sensorless control unit for a brushless DC motor that is suitable for driving a pump that sucks in and discharges oil.

2. Discussion of Background

Hydraulic pressure is supplied to a transmission of a vehicle by a hydraulic pump. In a vehicle that carries out so-called idling stop, which is a technique of stopping an engine when the vehicle stops, in view of, for example, energy-saving, an electric hydraulic pump is used to reliably supply hydraulic pressure to the transmission even during idling stop.

A brushless DC motor is used as an electric motor for driving a pump, which is mounted in a vehicle. In addition, so-called sensorless control for driving the motor without the use of a rotational position detection sensor is executed.

In order to execute the sensorless control over the brushless DC motor, it is necessary to estimate the rotational position of a rotor and generate an estimated rotational position signal that corresponds to a rotational position signal from a rotational position detection sensor. The estimated rotational position signal is usually generated with the use of three-phase induced voltages of the motor. However, when the rotor is not rotating or is rotating at a low speed during start-up of the motor, induced voltages are zero or low. Therefore, it is not possible to generate an estimated rotational position signal. Accordingly, the pattern of electric power supply to the three phases is forcibly changed at regular intervals to generate a revolving magnetic field to thereby carry out forced commutation for forcibly rotating the rotor.

A sensorless control unit described in Japanese Patent Application Publication No. 2005-278320 (JP 2005-278320 A) rotates a brushless DC motor at a predetermined rotation speed, determines whether a rotor position is detectable, and makes a switchover from a forced commutation mode to a sensorless control mode when the rotor position becomes detectable.

When the above-described conventional sensorless control unit for a brushless DC motor is applied to a brushless DC motor for driving a hydraulic pump for a transmission of a vehicle, the following problem may occur. That is, if the oil temperature is low (the hydraulic load is high), it is not possible to make a smooth switchover from the forced commutation mode to the sensorless control mode.

That is, the conventional sensorless control unit may be unable to detect a rotor position after making a switchover to the sensorless control upon detection of the rotor position. In this case, it may not be possible to execute the sensorless control. In addition, it is difficult to quickly increase hydraulic pressure during start-up of the motor.

Therefore, in order not to cause a detection error even if the oil temperature is low, the rotation speed of the rotor in the forced commutation mode may be set to be high. In this case, however, there is a problem that the rotor is not able to follow changes in magnetic poles and therefore loss of synchronization is likely to occur.

SUMMARY OF THE INVENTION

The invention provides a sensorless control unit for a brushless DC motor, which makes a smooth switchover from a forced commutation mode to a sensorless control mode.

According to a feature of an example of the invention, in a sensorless control unit for a brushless DC motor, which sets a forced commutation mode to rotate the brushless DC motor during start-up of the brushless DC motor and makes a switchover to a sensorless control mode when a rotor position becomes detectable, in the forced commutation mode, a rotation speed is increased from a predetermined rotation speed by a predetermined increase amount each time and forced commutation is executed until the rotation speed reaches a set rotation speed; and the switchover to the sensorless control mode is made when the rotation speed reaches the set rotation speed and the rotor position becomes detectable.

BRIEF DESCRIPTION OF THE DRAWINGS

The foregoing and further objects, features and advantages of the invention will become apparent from the following description of example embodiment with reference to the accompanying drawings, wherein like numerals are used to represent like elements and wherein.

DETAILED DESCRIPTION OF EMBODIMENTS

Hereinafter, an embodiment of the invention will be described with reference to the accompanying drawings.

Figure 1:
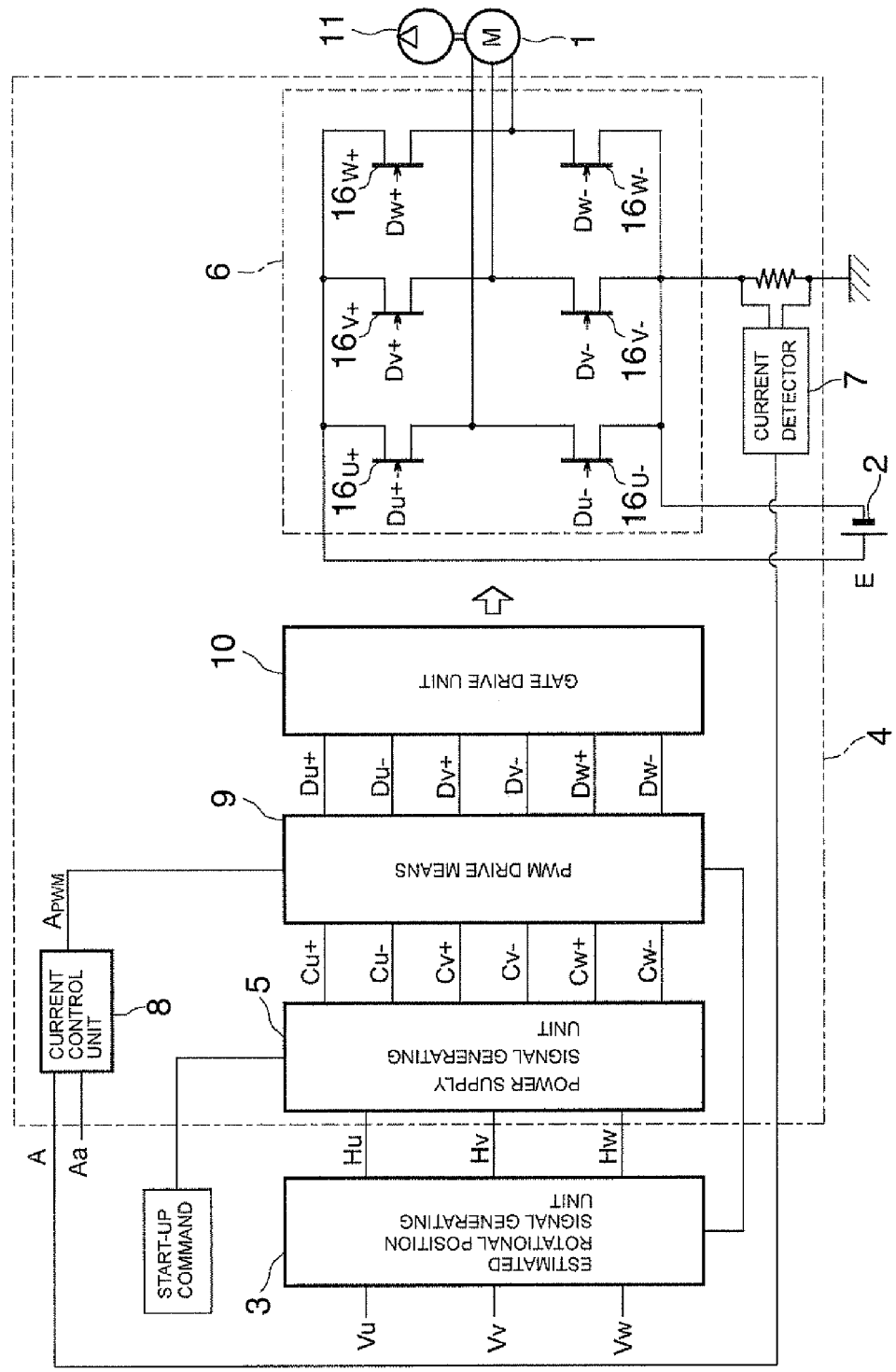
FIG. 1 is a block diagram that shows a sensorless control unit for a brushless DC motor.

FIG. 1 schematically shows the configuration of a sensorless control unit for a brushless DC motor.

The sensorless control unit for a brushless DC motor drives a brushless DC motor 1 with the use of a direct-current power source 2 formed of a battery mounted in a vehicle, in a one-sided PWM mode. The brushless DC motor 1 is mounted in the vehicle, and drives a pump 11 that sucks in and discharges oil. The sensorless control unit includes an estimated rotational position signal generating unit 3 that is estimated rotational position signal generating means for generating estimated rotational position signals regarding respective three phases in a digital mode based on phase voltages of the respective three phases, and power supply control unit 4 that is power supply control means for controlling power supply from the direct-current power source 2 to the three phases in a PWM mode based on the estimated rotational position signals regarding the respective three phases.

The estimated rotational position signal generating unit 3 generates estimated rotational position signals Hu, Hv and Hw regarding the respective three phases, based on the phase voltages Vu, Vv and Vw of the respective three phases, that is, the U phase, V phase and W phase of the motor 1.

The power supply control unit 4 includes power supply signal generating means 5, a switching circuit 6, a current detector 7, a current control unit 8, PWM drive means 9, and a gate drive circuit 10.

The power supply signal generating means 5 generates power supply signals Cu+, Cu−, Cv+, Cv−, Cw+ and Cw− for controlling power supply to respective elements based on the estimated rotational position signals Hu, Hv and Hw generated by the estimated rotational position signal generating unit 3. The power supply signal generating means 5 may be foamed of a microprocessing unit (MPU) or may be formed of an exclusive digital circuit.

The switching circuit 6 includes an upper arm switching element 16u+ and a lower arm switching element 16u− that control power supply from the power source 2 to the U phase of the motor 1, an upper arm switching element 16v+ and a lower arm switching element 16v− that control power supply from the power source 2 to the V phase of the motor 1, and an upper arm switching element 16w+ and a lower arm switching element 16w− that control power supply from the power source 2 to the W phase of the motor 1.

The current detector 7 connects a current measurement circuit to the switching circuit 6 to detect a motor current. A total value of currents passing through the U-phase, V-phase and W-phase stator coils of the motor 1 is detected by the current detector 7.

The current control unit 8 compares a detected current value A of the motor 1, detected by the current detector 7, with a current command value Aa, generates a current control signal Apwm for driving the motor 1 in a PWM mode based on the magnitude relation between the detected current value A and the current command value Aa, and then transmits the current control signal Apwm to the PWM drive means 9.

The PWM drive means 9 generates switching element control signals Du+, Du−, Dv+, Dv−, Dw+ and Dw− for the respective switching elements based on the received power supply signals and current control signal Apwm, and then outputs the switching element control signals Du+, Du−, Dv+, Dv−, Dw+ and Dw− to the gate drive circuit 10.

The gate drive circuit 10 turns on or off the switching elements based on the received switching element control signals to generate a revolving magnetic field over the stator coils of the motor 1.

In FIG. 1, at the time of start-up of the motor 1, a forced commutation mode is selected, and a start-up command is transmitted to the power supply signal generating unit 5. The power supply signal generating unit 5 provides the PWM drive means 9 with the power supply pattern stored in a memory upon reception of the start-up command. This is carried out irrespective of the rotor position of the motor 1. The rotation speed of the motor 1 is increased by increasing the frequency. A prescribed current is supplied from the direct-current power source 2 based on a value stored in the memory of the PWM drive means 9 instead of based on the current control signal Apwm from the current control unit 8. The current value is set to be larger than the rated current of the motor. The PWM drive means 9 outputs switching element control signals for the switching elements to the gate drive circuit 10 based on the power supply signals from the power supply signal generating unit 5. Thus, the switching elements are turned on or off, and a revolving magnetic field for forced commutation is generated over the stator coils of the motor 1.

By carrying out forced commutation, the phase voltages Vu, Vv and Vw of the U phase, V phase and W phase of the motor 1 increase. Thus, the estimated rotational position signal generating unit 3 is able to generate the estimated rotational position signals Hu, Hv and Hw for respective three phases (that is, the rotor position is detectable). Thus, the power supply signal generating unit 5 generates power supply signals based on the estimated rotational position signals Hu, Hv and Hw generated by the estimated rotational position signal generating unit 3. The PWM drive means 9 generates switching element control signals for the respective switching elements based on the power supply signals and the current control signal Apwm, and transmits the switching element control signals to the gate drive circuit 10. In this way, a switchover from the forced commutation mode to a sensorless control mode is made.

Figure 2:
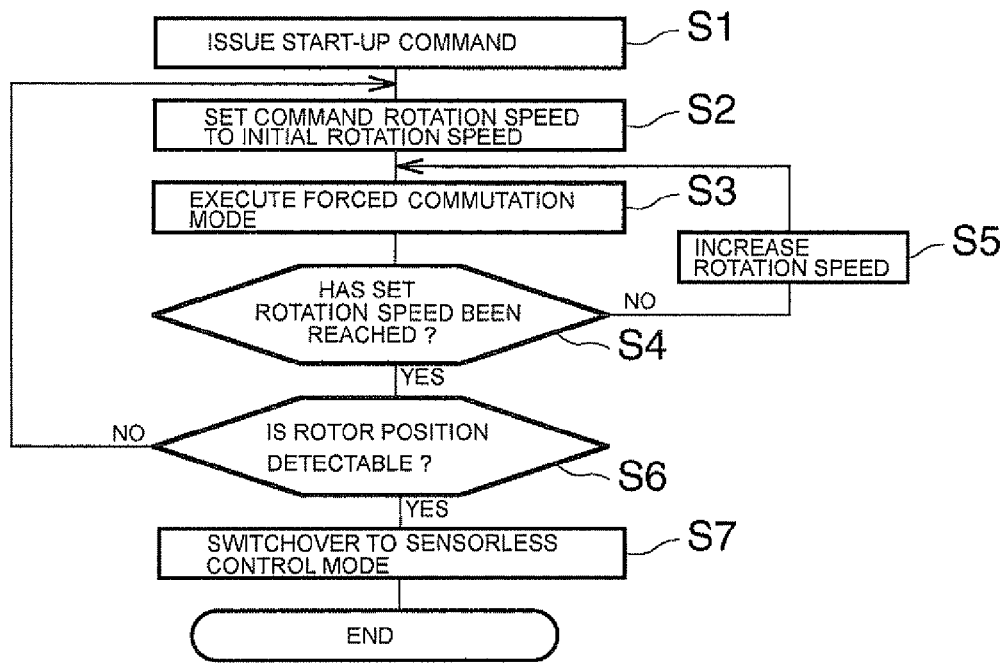
FIG. 2 is a flowchart that shows steps executed to make a switchover from a forced commutation mode to a sensorless control mode.

FIG. 2 shows a flowchart showing steps executed to make a switchover from the forced commutation mode to the sensorless control mode.

In the flowchart, the forced commutation mode is started based on the start-up command (S1), and, initially, a preset initial rotation speed (predetermined rotation speed) is set as a command rotation speed (S2). A revolving magnetic field corresponding to the command rotation speed is generated over the stator coils of the motor 1 to execute the forced commutation mode (S3). Subsequently, it is determined whether the command rotation speed has reached a set rotation speed (S4). Because the initial rotation speed is lower than the set rotation speed, a negative determination is made at the beginning, and the command rotation speed is set to the sum of the initial rotation speed and an amount of increase in the command rotation speed to increase the rotation speed of the motor 1 (S5). Thus, a revolving magnetic field corresponding to the increased command rotation speed is generated over the stator coils of the motor 1. Step (S5) of increasing the command rotation speed by the increase amount each time is continued until the command rotation speed reaches the set rotation speed. When the forced commutation mode is executed at the command rotation speed that has become equal to the set rotation speed, an affirmative determination is made in the following step (S4) of determining whether the command rotation speed has reached the set rotation speed, after which the forced commutation mode ends. After that, the process of prohibiting detection of the rotor position is cancelled, and it is determined whether the rotor position is detectable (S6). When an affirmative determination is made, a switchover to the sensorless control mode is made (S7). When a negative determination is made in the rotor position detecting step (S6), the process returns to step (S2) of setting the command rotation speed to the initial rotation speed, and the forced commutation mode (S3) is executed again.

Figure 3:
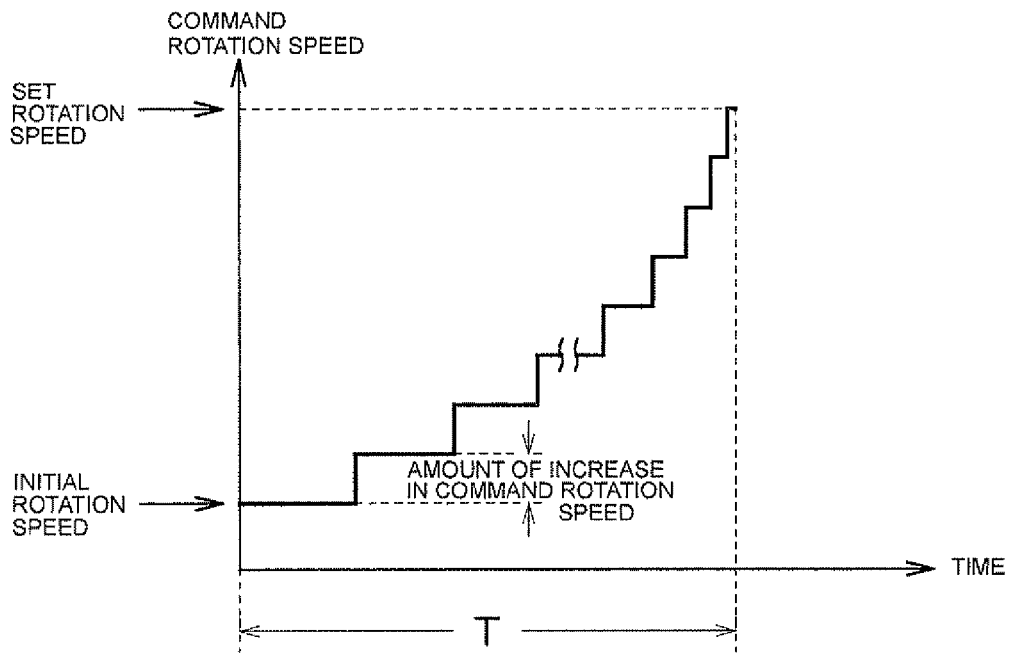
FIG. 3 is a graph that shows a temporal change in a command rotation speed in the forced commutation mode.

In step (S5) of increasing the rotation speed of the motor 1 in the flowchart of FIG. 2, the command rotation speed is changed as shown in FIG. 3. That is, an amount of increase in the command rotation speed is constant, and the duration of forced commutation at each command rotation speed is reduced with an increase in the command rotation speed. According to the flowchart of FIG. 2, when the command rotation speed has not reached the set rotation speed, the step of detecting the rotor position is not executed. Therefore, a period indicated by T in FIG. 3 is a rotor position detection prohibiting time. Thus, it is possible to avoid the situation where a switchover to the sensorless control mode is made at a command rotation speed that is lower than the set rotation speed (within a period of time that is shorter than the rotor position detection prohibiting time indicated by T in FIG. 3). Thus, it is possible to prevent an erroneous detection of the rotor position due to a low rotation speed.

Figure 4:
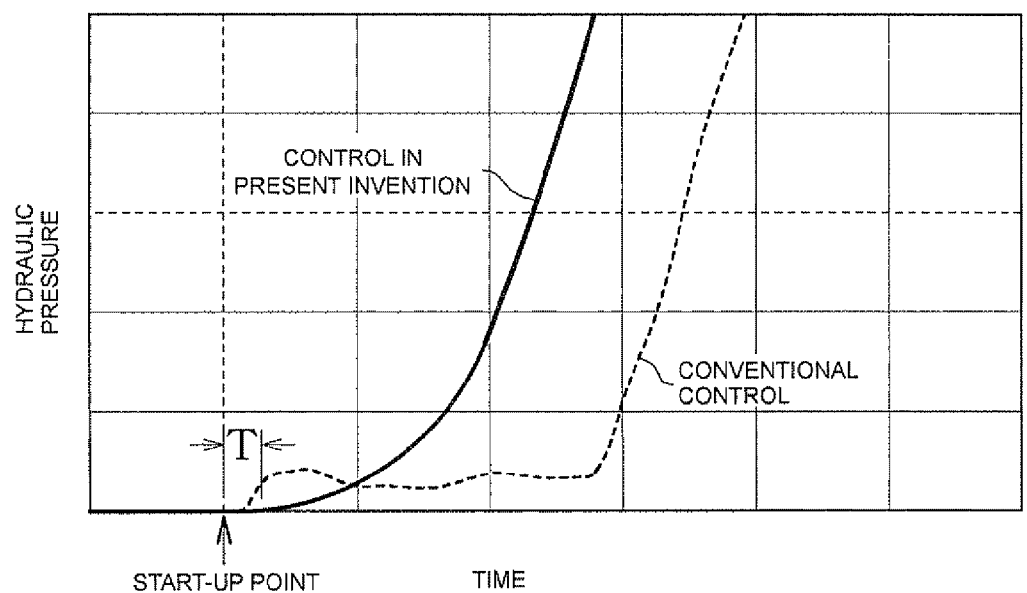
FIG. 4 is a graph that shows a comparison of temporal change in hydraulic pressure between control according to the invention and conventional control, in the case where a brushless DC motor is used to drive a hydraulic pump.

FIG. 4 shows a temporal change in hydraulic pressure in the pump 11, and shows a comparison with conventional control in which forced commutation is carried out at a constant rotation speed and, a switchover to the sensorless control is made when the rotational position of the rotor becomes detectable.

In the motor 1 that drives the hydraulic pump 11, when the oil temperature is low (e.g. 25° C.), the hydraulic load is high. Therefore, according to the conventional control, a switchover to the sensorless control mode may be made before an actual motor rotation speed reaches a sufficiently high value. In this case, as indicated by the broken line in the graph, after the hydraulic pressure starts increasing, the hydraulic pressure fluctuates within low values and does not promptly reach a sufficiently high hydraulic pressure. The cause of this problem is considered to be as follows; when the rotation speed is low, induced voltages are low, and the rotor position is detectable at times and is not detectable at other times even at the same rotation speed. Even if the command rotation speed in the forced commutation mode is set to be high, it is not possible to prevent a switchover to the sensorless control mode from being made before an actual motor rotation speed reaches a sufficiently high value.

In contrast to this, with the sensorless control unit for a brushless DC motor according to the embodiment of the invention, as described above, the command rotation speed in the forced commutation mode is increased gradually and, only when the command rotation speed reaches the set rotation speed and the rotor position becomes detectable, a switchover to the sensorless control mode is made. Thus, it is possible to make a smooth switchover from the forced commutation mode to the sensorless control mode. Therefore, with the sensorless control unit for a brushless DC motor according to the embodiment of the invention, as indicated by the solid line in the graph, the hydraulic pressure increases with time and reaches a desired reference hydraulic pressure within a shorter period of time. Note that, in FIG. 4, T denotes a period of time during which the forced commutation mode is executed (the same period of time as T in FIG. 3, that is, the rotor position detection prohibiting time).

In the above configuration, the initial rotation speed and the set rotation speed are set to values effective to reduce the start-up time. Specifically, the initial rotation speed is set to a value that is slightly lower than the minimum value of rotation speeds at which loss of synchronization may occur, and the set rotation speed is set to a value that is an appropriate value for a switchover to the sensorless control although that is a value at which loss of synchronization may occur if it is set as the initial rotation speed. The amount of increase in the command rotation speed is set as needed based on the desired rotor position detection prohibiting time T. That is, when a duration between the start of the forced commutation mode and the start of the sensorless control mode needs to be reduced by reducing the rotor position detection prohibiting time T, the amount of increase in the command rotation speed may be increased to such a degree that loss of synchronization does not occur.

The initial rotation speed, the amount of increase in the command rotation speed, and the set rotation speed are set appropriately for each motor. Thus, even when the motor is replaced, it is not necessary to change the sequence.

In the above embodiment, the brushless DC motor 1 that is used to drive the in-vehicle electric hydraulic pump 11 is described. However, the invention is applicable to sensorless control units for any brushless DC motors that employ a 120-degree rectangular wave energization drive method.

Note that, in the block diagram shown in FIG. 1, in addition to or instead of the current control unit 8, a speed control unit may be provided. The speed control unit compares a detected rotation speed value S of a rotor of the motor 1 with a set rotation speed value Sa that includes a rotation direction and that is externally transmitted, generates a speed control signal Spwm for driving the motor 1 in a PWM mode based on the magnitude relation between the detected rotation speed value S and the set rotation speed value Sa, and outputs the speed control signal Spwm to the PWM drive means 9.

What is claimed is:

1. A sensorless control unit for a brushless DC motor, comprising:
   a processor configured to:
   set a forced commutation mode to rotate the brushless DC motor during start-up of the brushless DC motor; and
   make a switchover to a sensorless control mode when a rotor position becomes detectable, wherein:
   in the forced commutation mode, a rotation speed is increased from a predetermined rotation speed by a predetermined increase amount each time and forced commutation is executed until the rotation speed reaches a set rotation speed,
   the switchover to the sensorless control mode is made when the rotation speed reaches the set rotation speed and the rotor position becomes detectable, and
   the predetermined amount of increase in the rotation speed is constant, and a duration of the forced commutation at each rotation speed is reduced with the increase in the rotation speed.

2. The sensorless control unit for a brushless DC motor according to claim 1, wherein the sensorless control unit controls the brushless DC motor that drives a pump that sucks in and discharges oil.

* * * * *